(12) United States Patent
Yamamoto

(10) Patent No.: US 6,563,689 B2
(45) Date of Patent: May 13, 2003

(54) FEEDTHROUGH TYPE THREE-TERMINAL ELECTRONIC COMPONENT

(75) Inventor: Shigekatsu Yamamoto, Takefu (JP)

(73) Assignee: Murata Manufacturing Co., Ltd., Kyoto (JP)

(*) Notice: Subject to any disclaimer, the term of this patent is extended or adjusted under 35 U.S.C. 154(b) by 0 days.

(21) Appl. No.: 10/176,037

(22) Filed: Jun. 21, 2002

(65) Prior Publication Data
US 2003/0011962 A1 Jan. 16, 2003

(30) Foreign Application Priority Data
Jul. 10, 2001 (JP) ........................... 2001-208984

(51) Int. Cl.[7] ............................................. H01G 4/228
(52) U.S. Cl. .................... 361/306.1; 361/306.3; 361/321.2; 361/306.1
(58) Field of Search ..................... 361/301.4, 302, 361/303, 306.1, 306.3, 308.1, 309, 311–313, 321.2

(56) References Cited

U.S. PATENT DOCUMENTS 6,456,481 B1 * 9/2002 Stevenson ............... 361/302

* cited by examiner

Primary Examiner—Anthony Dinkins
(74) Attorney, Agent, or Firm—Keating & Bennett, LLP

(57) ABSTRACT

A feedthrough type three-terminal electronic component has a monolithic structure including stacked internal signal electrodes and internal ground electrodes with dielectric layers disposed therebetween Internal dummy electrodes, which essentially do not contribute to electrostatic capacity formation, are disposed in at least one of a region defined by both side portions of internal signal electrodes and an external ground electrode provided on both side surfaces of the monolithic structure, viewing the monolithic structure in planar fashion, and a region defined by both side portions of internal ground electrodes and external signal electrodes provided on both side surfaces of the monolithic structure, viewing the monolithic structure in planar fashion. Thus, a highly reliable feedthrough type three-terminal electronic component with a uniform sintering state in the monolithic structure, and low resistance, is provided.

20 Claims, 8 Drawing Sheets

FEEDTHROUGH TYPE THREE-TERMINAL ELECTRONIC COMPONENT

BACKGROUND OF THE INVENTION

1. Field of the invention

The present invention relates to a feedthrough type three-terminal electronic component having a monolithic structure formed by stacking one or more pairs of an internal signal electrode and an internal ground electrode so as to face one another across a dielectric layer, a pair of external signal electrodes which are connected to extension portions of the internal signal electrodes, and an external ground electrode connected to internal ground electrodes.

2. Description of the Related Art

FIGS. 6A and 6B, 7A and 7B, and 8 illustrate a feedthrough type three-terminal electronic component (feedthrough type three-terminal capacitor) which is a type of a monolithic electronic component.

Here, FIG. 6A is a front cross-sectional view of a conventional feedthrough type three-terminal electronic component, FIG. 6B is a side cross-sectional view thereof, FIG. 7A is a plan view illustrating the form of an internal signal electrode, which is an element of a conventional feedthrough type three-terminal electronic component, FIG. 7B is a plan view illustrating the form of an internal ground electrode, and FIG. 8 is a perspective view illustrating the external configuration of a conventional feedthrough type three-terminal electronic component.

The feedthrough type three-terminal electronic component has a structure wherein, a monolithic structure 54 (FIG. 8) is formed by stacking an internal signal electrode 52 (see FIG. 7A) and an internal ground electrode 53 (see FIG. 7B) so that the principal portions thereof face one another across a dielectric layer 51 as shown in FIGS. 6A and 6B. In addition, as shown in FIG. 8, a pair of external signal electrodes 55a and 55b (FIG. 6A) to which the extension portions 52a and 52b of internal signal electrodes 52 are connected is disposed on both end surfaces of the monolithic structure 54, and an external ground electrode 56 (FIG. 6B) to which the extension portions 53a and 53b of internal ground electrodes 53 are connected is disposed on both side surfaces of the monolithic structure 54.

Now, with a feedthrough type three-terminal electronic component (feedthrough type three-terminal capacitor) having such a structure, normally, the electronic component includes a predetermined number of ceramic green sheets 57 upon which is disposed an internal signal electrode (pattern) 52 as shown in FIG. 7A and ceramic green sheets 58 upon which is disposed an internal ground electrode (pattern) 53 as shown in FIG. 7B being alternately layered, and further, outer layer ceramic green sheets (not shown) with no internal electrodes disposed thereon being layered on both the top and bottom and surfaces, and subjected to the processes of compression and baking, so that, as shown in FIGS. 6A and 6B, internal electrodes (the internal signal electrodes 52 and internal ground electrodes 53) are layered with high concentration at the region X (electrode layering region) wherein the internal signal electrodes 52 and internal ground electrodes 53 are layered, but at the regions Y (extension portion layering region for signals) wherein the extension portions 52a and 52b of the internal signal electrodes 52 are disposed, and at the regions Z (extension portion layering region for grounding) wherein the extension portions 53a and 53b of the internal ground electrodes 53 are disposed, the internal electrodes (extension portions 52a and 52b and extension portions 53a and 53b) are disposed at every other layer (sparsely), meaning that there are irregularities in the layering concentration (distribution concentration) of the internal electrodes.

Consequently, at the time of baking the monolithic structure, scattering at the internal electrodes partially and selectively increases, so the sintering state of the internal electrodes becomes non-uniform, resulting in a problem wherein there are irregularities in the resistance of the internal electrodes.

Particularly, the sintering tends to be insufficient in the signal extension portion layering regions Y and the grounding extension portion layering regions Z, and connection with the external signal electrodes 55a and 55b and the external ground electrode 56 becomes poor, so there has been a problem in that the DC resistance tends to fluctuate.

Also, the resistance of the internal signal electrodes and the internal ground electrodes normally tends to become high in the event that sintering is insufficient, but these characteristics also become high in the event that sintering is excessive, and the irregularities in concentration on the monolithic structure due to the disposed state of the internal signal electrodes and grounding causes insufficient or excessive sintering, and is a great factor leading to fluctuations in the DC resistance.

SUMMARY OF THE INVENTION

In order to overcome the problems described above, preferred embodiments of the present invention provide a highly reliable feedthrough type three-terminal electronic component having a monolithic structure including internal signal electrodes and internal ground electrodes stacked so as to face one another across a dielectric layer, wherein the sintering state of the monolithic structure is uniform and DC resistance is very small.

According to a first preferred embodiment of the present invention, a feedthrough type three-terminal electronic component includes a monolithic structure having one or more pairs of an internal signal electrode and an internal ground electrode stacked so as to face one another across a dielectric layer, external signal electrodes communicating with extension portions of the internal signal electrodes and disposed on both end surfaces of the monolithic structure, and an external ground electrode communicating with extension portions of the internal ground electrodes and disposed on both side surfaces of the monolithic structure, wherein internal dummy electrodes, which essentially do not contribute to electrostatic capacity formation, are disposed in at least one of: (a) a region defined by both side portions of the internal signal electrodes and the external ground electrode provided on both side surfaces of the monolithic structure, viewing the monolithic structure in planar fashion; and (b) a region defined by both side portions of the internal ground electrodes and the external signal electrodes provided on both side surfaces of the monolithic structure, viewing the monolithic structure in planar fashion.

Disposing internal dummy electrodes which essentially do not contribute to electrostatic capacity formation in at least one of a region defined by both side portions of internal signal electrodes and the external ground electrode provided on both side surfaces of the monolithic structure, viewing the monolithic structure in planar fashion, and a region defined by both side portions of internal ground electrodes and external signal electrodes provided on both side surfaces of the monolithic structure, viewing the monolithic structure in planar fashion, suppresses irregularities in the concentration of internal electrodes disposed within the monolithic structure and makes the sintering state of internal electrodes at the time of baking the monolithic structure uniform, thereby enabling irregularities in the resistance of internal electrodes to be minimized and prevented.

That is, with the feedthrough type three-terminal electronic component according to preferred embodiments of the present invention, there are few irregularities in the concentration of internal electrodes, imbalance in the state of disposal of internal electrodes in the monolithic structure formed by alternately stacking internal signal electrodes and internal ground electrodes across dielectric layers (ceramic green sheets) and compressing in the manufacturing process is prevented from occurring, thereby preventing irregularities in the compression state and making the sintering state uniform. Accordingly, a feedthrough type three-terminal electronic component with small DC resistance and high reliability can be obtained in a highly reliable manner.

Further, providing internal dummy electrodes increases the area of contact between the external signal electrodes and internal signal electrodes, and the area of contact between the external ground electrode and internal ground electrodes, thereby increasing the adhesion strength of the external electrodes, while the increased area of contact reduces the contact resistance, thereby improving anti-surge properties.

Now, with preferred embodiments of the present invention, the phrase "a region defined by both side portions of internal signal electrodes and the external ground electrode provided on both side surfaces of the monolithic structure, viewing the monolithic structure in planar fashion" is a concept meaning a region defined by both side portions of internal signal electrodes and the external ground electrode provided on both side surfaces of the monolithic structure, viewing the monolithic structure in planar fashion, regardless of whether on the same plane in the monolithic structure where an internal signal electrode is disposed or on a different plane. This is a broad concept including not only feedthrough type three-terminal electronic components manufactured by a process wherein, for example, internal dummy electrodes are disposed on the same ceramic green sheets where internal signal electrodes are disposed, and the ceramic green sheets are layered, of course, but also to feedthrough type three-terminal electronic components manufactured by a process wherein internal dummy electrodes are disposed on different ceramic green sheets from those where internal signal jog electrodes are disposed, and the ceramic green sheets are stacked.

Further, the concept of "a region defined by both side portions of internal ground electrodes and external signal electrodes provided on both end surfaces of the monolithic structure, viewing the monolithic structure in planar fashion" is also a broad concept in the same way as with the above-described region defined by both side portions of internal signal electrodes and the external ground electrode provided on both side surfaces of the monolithic structure.

Moreover, with preferred embodiments of the present invention, the internal dummy electrodes may or may not be in a state of conducting with the external signal electrodes and the external ground electrode. However, a situation wherein the internal dummy electrodes are in a state of conducting with the internal signal electrodes and internal ground electrodes is undesirable, since the internal dummy electrodes will greatly contribute to electrostatic capacity formation.

Also, according to a second preferred embodiment of the present invention, a feedthrough type three-terminal electronic component includes a monolithic structure including a stack of one or more pairs of an internal signal electrode and an internal ground electrode, facing one another across a dielectric layer, external signal electrodes communicating with extension portions of internal signal electrodes and disposed on both end surfaces of the monolithic structure, and an external ground electrode communicating with extension portions of internal ground electrodes and disposed on both side surfaces of the monolithic structure, wherein internal dummy electrodes, which essentially do not contribute to electrostatic capacity formation, are disposed in both: (a) a region defined by both side portions of internal signal electrodes and the external ground electrode provided on both side surfaces of the monolithic structure, viewing the monolithic structure in planar fashion, and (b) a region defined by both side portions of internal ground electrodes and external signal electrodes provided on both side surfaces of the monolithic structure, viewing the monolithic structure in planar fashion.

Disposing internal dummy electrodes which essentially do not contribute to electrostatic capacity formation in both a region defined by both side portions of internal signal electrodes and the external ground electrode provided on both side surfaces of the monolithic structure, viewing the monolithic structure in planar fashion, and a region defined by both side portions of internal ground electrodes and external signal electrodes provided on both side surfaces of the monolithic structure, viewing the monolithic structure in planar fashion, enables irregularities in the concentration of internal electrodes disposed in the monolithic structure to be prevented and eliminated, thereby making the sintering state of internal electrodes at the time of baking the monolithic structure uniform.

Further, the area of contact between the external signal electrodes and internal signal electrodes and the area of contact between the external ground electrode and internal ground electrodes increases, such that increases in contact resistance are minimized and prevented in an even more reliable manner, and consequently, the completed product has excellent anti-surge properties.

Also, regarding the internal dummy electrodes, internal dummy electrodes, disposed in a region defined by both side portions of internal signal electrodes and the external ground electrode provided on both side surfaces of the monolithic structure, may have a form essentially corresponding to the form of the extension portions of internal ground electrodes, and may have dimensions extending in the direction following both side surfaces of the monolithic structure which are essentially the same as or greater than the width of the extension portions of the internal ground electrodes. Alternatively, internal dummy electrodes, disposed in a region defined by both side portions of internal ground electrodes and external signal electrodes provided on both side surfaces of the monolithic structure, may have a form essentially corresponding to the form of the extension portions of internal signal electrodes, and may have dimensions extending in the direction following both end surfaces of the monolithic structure which are essentially the same as or greater than the width of the extension portions of the internal signal electrodes.

This arrangement wherein, of the internal dummy electrodes, internal dummy electrodes, disposed in a region defined by both side portions of internal signal electrodes and the external ground electrode provided on both side surfaces of the monolithic structure, have a form essentially corresponding to the form of the extension portions of internal ground electrodes, and have dimensions extending in the direction following both side surfaces of the monolithic structure which are essentially the same as or greater than the width of the extension portions of the internal ground electrodes, and internal dummy electrodes, disposed in a region defined by both side portions of internal ground electrodes and external signal electrodes provided on both side surfaces of the monolithic structure, have a form essentially corresponding to the form of the extension portions of internal signal electrodes, and have dimensions extending in the direction following both end surfaces of the monolithic structure which are essentially the same as or greater than the width of the extension portions of the internal signal electrodes, enables the disposed state of the internal electrodes to be even more uniform, achieving further advantages of the present invention.

The reason that the dimensions of the internal dummy electrodes in the above-described predetermined direction are preferably the same as or greater than the width of the extension portions of the internal ground electrodes or internal signal electrodes is that this structure results in each of the electrodes being sandwiched between dummy electrodes from above and below, thereby facilitating making uniform the sintering state of the internal electrodes.

In an alternative arrangement, the internal dummy electrodes may be disposed only in the region defined by both side portions of internal signal electrodes and the external ground electrode provided on both side surfaces of the monolithic structure, and may not be disposed in the region defined by both side portions of internal ground electrodes and external signal electrodes provided on both side surfaces of the monolithic structure.

With the arrangement wherein internal dummy electrodes are disposed only in the region defined by both side portions of internal signal electrodes and the external ground electrode provided on both side surfaces of the monolithic structure, the sintering state is made uniform to a degree which is sufficiently meaningful for actual use, and the DC resistance is greatly reduced. This is because the width of the extension portions of the internal ground electrodes is smaller than the width of the extension portions of the internal signal electrodes, and accordingly is more readily affected by sintering of the internal electrodes.

Also, Ni or a Ni alloy may be used as a material for forming the internal signal electrodes and the internal ground electrodes.

In the event that Ni or a Ni alloy is used as the material for forming the internal signal electrodes and the internal ground electrodes, irregularities in the sintering state occur more readily due to imbalance in the state of internal electrodes disposed in the monolithic structure, since Ni scatters more readily than Pd at the time of sintering, but the sintering state can be made uniform and the DC resistance reduced by applying preferred embodiments of the present invention in such a case, which is particularly significant.

Also, the thickness of the internal signal electrodes, the internal ground electrodes, and the internal dummy electrodes, may be about 2 $\mu$m or less.

As the number of layers of internal electrodes increases, the thickness of the internal signal electrodes, internal ground electrodes, and internal dummy electrodes often becomes thinner, and in the event that the thickness of the internal electrodes including the extension portion is about 2 $\mu$m or less, great fluctuations in DC resistance readily occur due to the sintering state of the internal electrodes, but in such a case, applying preferred embodiments of the present invention allows a feedthrough type three-terminal electronic component to be obtained with a uniform sintering state and small DC resistance, which is particularly significant.

Other features, elements, characteristics and advantages of the present invention will become more apparent from the following detailed description of preferred embodiments with reference to the attached drawings.

DETAILED DESCRIPTION OF PREFERRED EMBODIMENTS

Features of the present invention will be further described in the following description of a preferred embodiment thereof. A feedthrough type three-terminal capacitor will be described as an example of a feedthrough type three-terminal electronic component.

Figure 1A:
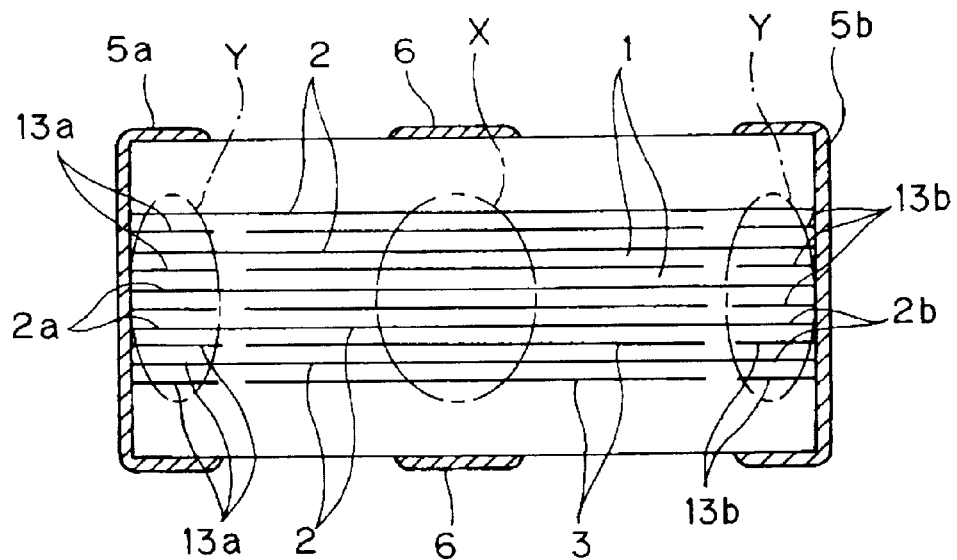
FIG. 1A is a front cross-sectional view of a feedthrough type three-terminal electronic component (feedthrough type three-terminal capacitor) according to a preferred embodiment of the present invention.
Figure 1B:
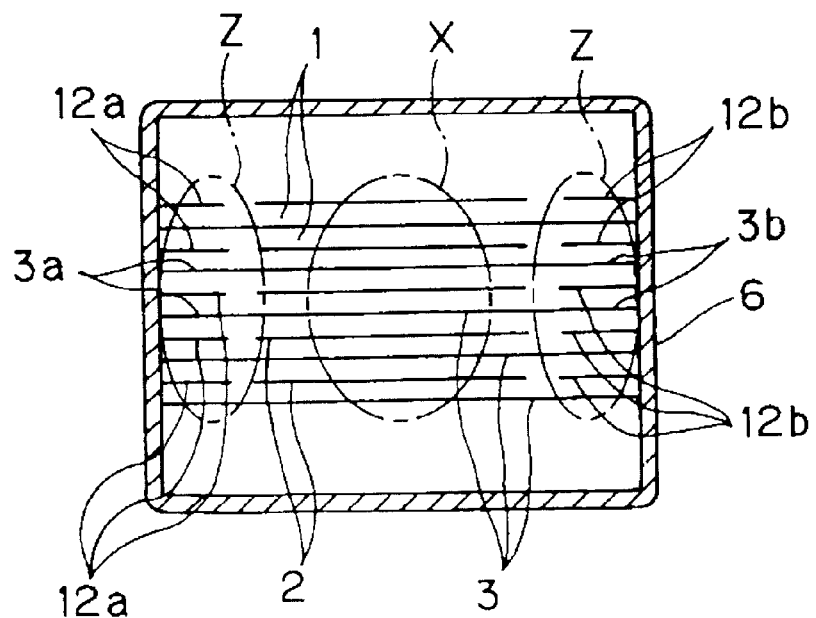
FIG. 1B is a side cross-sectional view of the feedthrough type three-terminal electronic component of FIG. 1A.
Figure 2A:
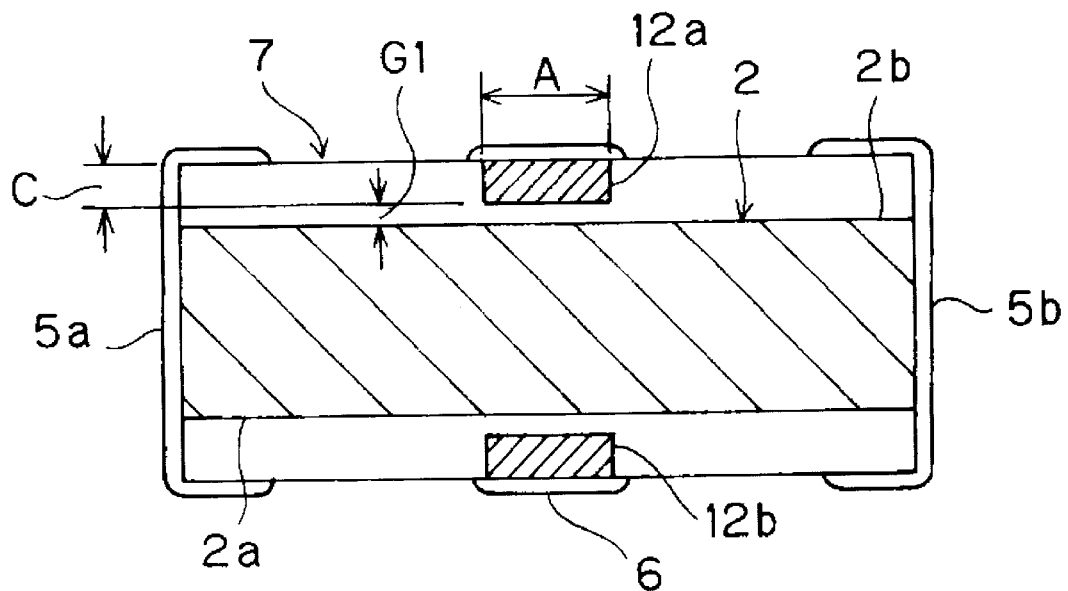
FIG. 2A is a plan view illustrating the form of internal signal electrodes making up the feedthrough type three-terminal capacitor according to a preferred embodiment of the present invention.
Figure 2B:
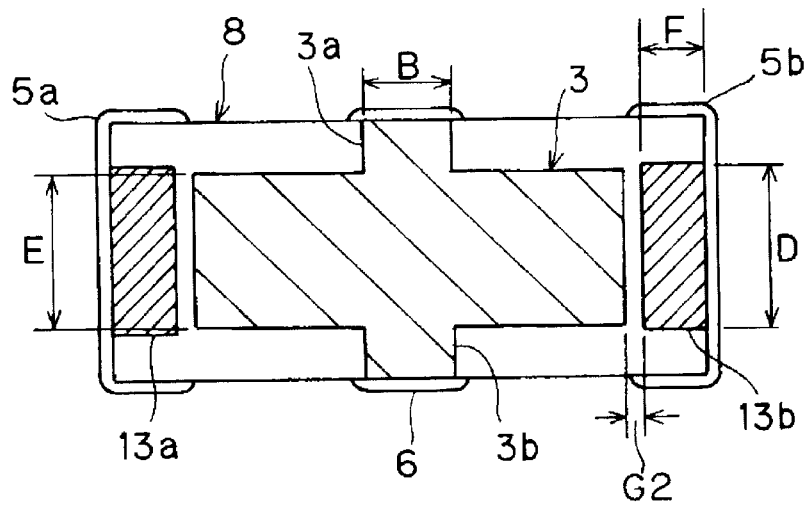
FIG. 2B is a plan view illustrating the form of internal ground electrodes in FIG. 2A.
Figure 3:
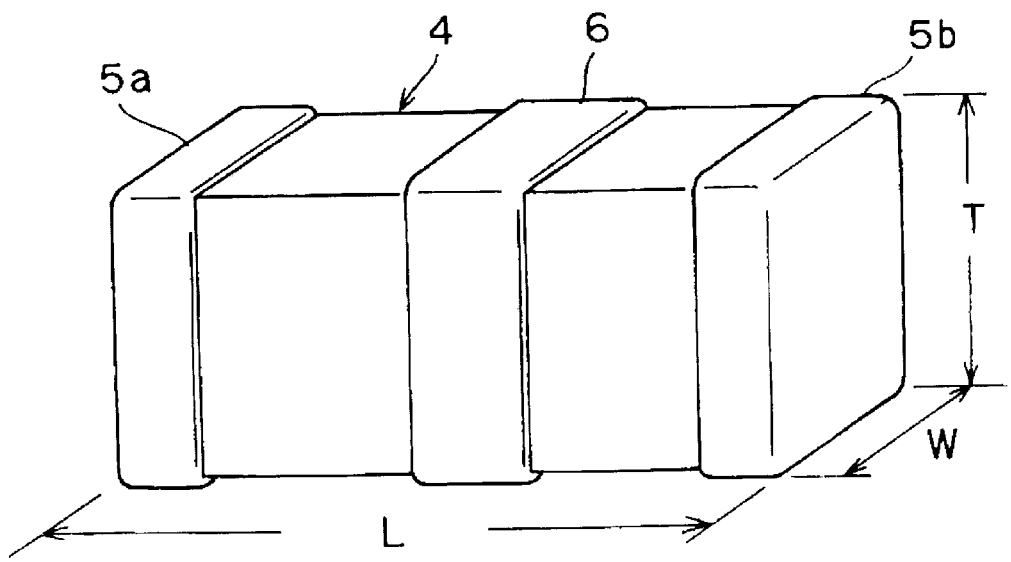
FIG. 3 is a perspective view illustrating the external configuration of the feedthrough type three-terminal capacitor according to a preferred embodiment of the present invention.

FIG. 1A is a front cross-sectional view of a feedthrough type three-terminal electronic component (feedthrough type three-terminal capacitor) according to a preferred embodiment of the present invention, FIG. 1B is a side cross-sectional view thereof, FIG. 2A is a plan view illustrating the form of internal signal electrodes making up the feedthrough type three-terminal capacitor shown in FIG. 1, FIG. 2B is a plan view illustrating the form of internal ground electrodes, and FIG. 3 is a perspective view illustrating the external configuration of the feedthrough type three-terminal capacitor according to the present preferred embodiment.

As shown in FIGS. 1A through 3, the feedthrough type three-terminal capacitor according to the present preferred embodiment is a monolithic structure 4 formed by stacking internal signal electrodes 2 (see FIG. 2A) and internal ground electrodes 3 (see FIG. 2B) so that the principal portions thereof face one another across a dielectric layer 1, with a pair of external signal electrodes 5a and 5b to which the extension portions 2a and 2b of internal signal electrodes 2 (FIG. 2A) are connected being disposed on both end surfaces of the monolithic structure 4, and with an external ground electrode 6 to which the extension portions 3a and 3b of internal ground electrodes 3 (FIG. 2B) are connected being disposed on both side surfaces of the monolithic structure 4 in a wraparound manner (see FIG. 3).

Also, as shown in FIGS. 2A and 2B, with the feedthrough type three-terminal capacitor, internal dummy electrodes 12a and 12b, which essentially do not contribute to electrostatic capacity formation, are disposed in a region defined by both side portions of internal signal electrodes 2 and an external ground electrode 3 provided on both side surfaces of the monolithic structure 4, viewing the monolithic structure 4 in planar fashion, and internal dummy electrodes 13a and 13b, which essentially do not contribute to electrostatic capacity formation, are disposed in a region defined by both side portions of internal ground electrodes 3 and external signal electrodes 5a and 5b provided on both side surfaces of the monolithic structure 4, viewing the monolithic structure 4 in planar fashion.

Also, with the feedthrough type three-terminal capacitor according to the present preferred embodiment, the internal signal electrodes 2, internal ground electrodes 3, and internal dummy electrodes 12a, 12b, 13a, and 13b, are each electrodes preferably having Ni as the primary component thereof.

Also, a barium titanate ceramic material is preferably used for the dielectric layer 1.

A feedthrough type three-terminal capacitor having a structure such as described above is manufactured by, for example, a predetermined number of ceramic green sheets 7 upon each of which is disposed an internal signal electrode (pattern) 2 and internal dummy electrodes (pattern) 12a and 12b, such as shown in FIG. 2A, and a predetermined number of ceramic green sheets 8 upon each of which is disposed an internal ground electrode (pattern) 3 and internal dummy electrodes (pattern) 13a and 13b, such as shown in FIG. 2B, being alternately stacked, and further, outer layer ceramic green sheets (not shown) with no internal electrodes disposed being layered on both the top and bottom and sides, the article being compressed and baked, following which a pair of external signal electrodes 5a and 5b and an external ground electrode 6 are formed by a method such as applying electroconductive paste and baking, or other suitable process.

However, normally, a method is used wherein mother ceramic green sheets are layered and compressed to form a mother monolithic member, which is cut at predetermined locations and divided into a great number of elements, in order to improve productivity. Note that the manufacturing method for the feedthrough type three-terminal electronic component according to the present invention is by no means restricted to this, and may be manufactured by a wide variety of methods.

The dimensions of the feedthrough type three-terminal capacitor according to an example of preferred embodiments of the present embodiment, manufactured as described above, are as follows:

Length (L): about 2.0 mm

Width (W): about 1.25 mm

Thickness (T): about 0.8 mm

Also, the thickness of the internal signal electrodes 2, external ground electrodes 3, internal dummy electrodes 12a and 12b, and internal dummy electrodes 13a and 13b, is, for example, about 1.5 $\mu$m, with 10 layers (5 layers of the internal signal electrodes 2 and internal dummy electrodes 12a and 12b, and 5 layers of the internal ground electrodes 3 and internal dummy electrodes 13a and 13b) being layered.

In the event that the thickness of the internal electrodes including the extension portion is about 2 $\mu$m or less, great fluctuations in DC resistance readily occur due to the sintering state of the internal electrodes, but in such a case, applying the features of preferred embodiments of the present invention allows a feedthrough type three-terminal capacitor to be obtained with a uniform sintering state and small DC resistance.

Also, with this feedthrough type three-terminal capacitor according to the present preferred embodiment, the thickness of the dielectric layer is preferably about 20 $\mu$m.

Further, with this feedthrough type three-terminal capacitor according to the present preferred embodiment, the dimension A of the internal dummy electrodes 12a and 12b shown in FIG. 2A in the direction following the side surfaces of the monolithic structure 4 is about 0.3 mm, which is approximately the same as the width B (about 0.3 mm) of the extension portions 3a and 3b of the internal ground electrodes 3. Also, the dimension C of the internal dummy electrodes 12a and 12b in the direction that is substantially perpendicular to both side surfaces of the monolithic structure 4 is about 0.2 mm.

Also, the dimension D of the internal dummy electrodes 13a and 13b shown in FIG. 2B in the direction that is substantially perpendicular to both side surfaces of the monolithic structure 4 is about 0.8 mm, which is the same as the width E (about 0.8 mm) of the extension portions 2a and 2b of the internal signal electrodes 2, and also the dimension F of the internal dummy electrodes 13a and 13b in the direction following both side surfaces of the monolithic structure 4 is about 0.6 mm.

Also, the gap G1 (FIG. 2A) between the internal dummy electrodes 12a and 12b and the internal signal electrode 2, and the gap G2 (FIG. 2B) between the internal dummy electrodes 13a and 13b and the internal ground electrode 3 preferably have dimensions wherein there are no effects of bleeding at the time of forming (printing) the internal electrodes, and in the case of the present preferred embodiment, both G1 and G2 are approximately 0.1 mm.

The serial resistance values of the feedthrough type three-terminal capacitor according to the present preferred embodiment were measurement. The following are the results.

Serial resistance values of the feedthrough type three-terminal capacitor with the conventional structure, illustrated in FIGS. 6A through 8:
Average value (n=10): 120.4 m
Standard deviation: 8.38 m Serial resistance values of the feedthrough type three-terminal capacitor according to a preferred embodiment of the present invention, illustrated in FIGS. 1A through 3:
Average value (n=10): 90.2 m
Standard deviation: 4.71 m It can be understood from these results that with the feedthrough type three-terminal capacitor according to the present preferred embodiment of the present invention, the serial resistance values are reduced approximately 30% as compared to the feedthrough type three-terminal capacitor with the conventional structure, while the standard deviation is improved by 50%.

The reason that the serial resistance values decrease with the feedthrough type three-terminal capacitor according to the present preferred embodiment is that, as described above, internal dummy electrodes 13a and 13b are disposed at the regions Y (extension portion layering region for signals) (FIG. 1A) of the monolithic structure 4 where the extension portions 2a and 2b of the internal signal electrodes 2 are disposed, and internal dummy electrodes 12a and 12b are disposed at the regions Z (extension portion layering region for grounding) (FIG. 1B) where the extension portions 3a and 3b of the internal ground electrodes 3 are disposed, so the state of internal electrodes disposed is approximately uniform between the region X (electrode layering region) (FIGS. 1A and 1B) where the internal signal electrodes 2 and internal ground electrodes 3 are layered and the signal extension portion layering region Y and ground extension portion layering region Z, so the sintering state becomes uniform.

Figure 4A:
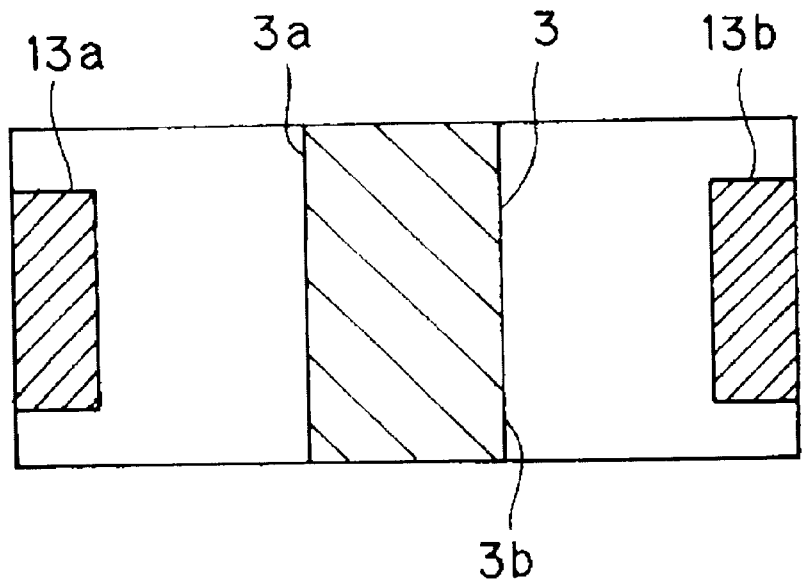
FIG. 4A is a diagram illustrating a modification of the feedthrough type three-terminal capacitor according to a preferred embodiment of the present invention.
Figure 4B:
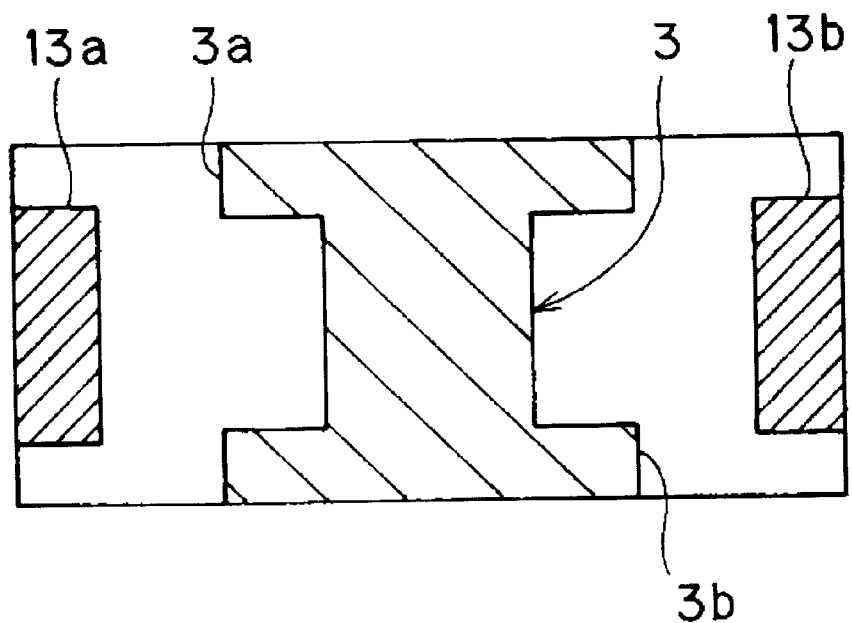
FIG. 4B is a diagram illustrating another modification of the feedthrough type three-terminal capacitor according to a preferred embodiment of the present invention.

With the present invention, there is no particular restriction in the specific form of the internal signal electrodes 2 and internal ground electrodes 3, and various forms may be used, such as, as shown in FIG. 4A, a form wherein the internal ground electrode 3 is substantially rectangular, or as shown in FIG. 4B, a form wherein the extension portions 3a and 3b are wider than the internal ground electrode 3.

Figure 5:
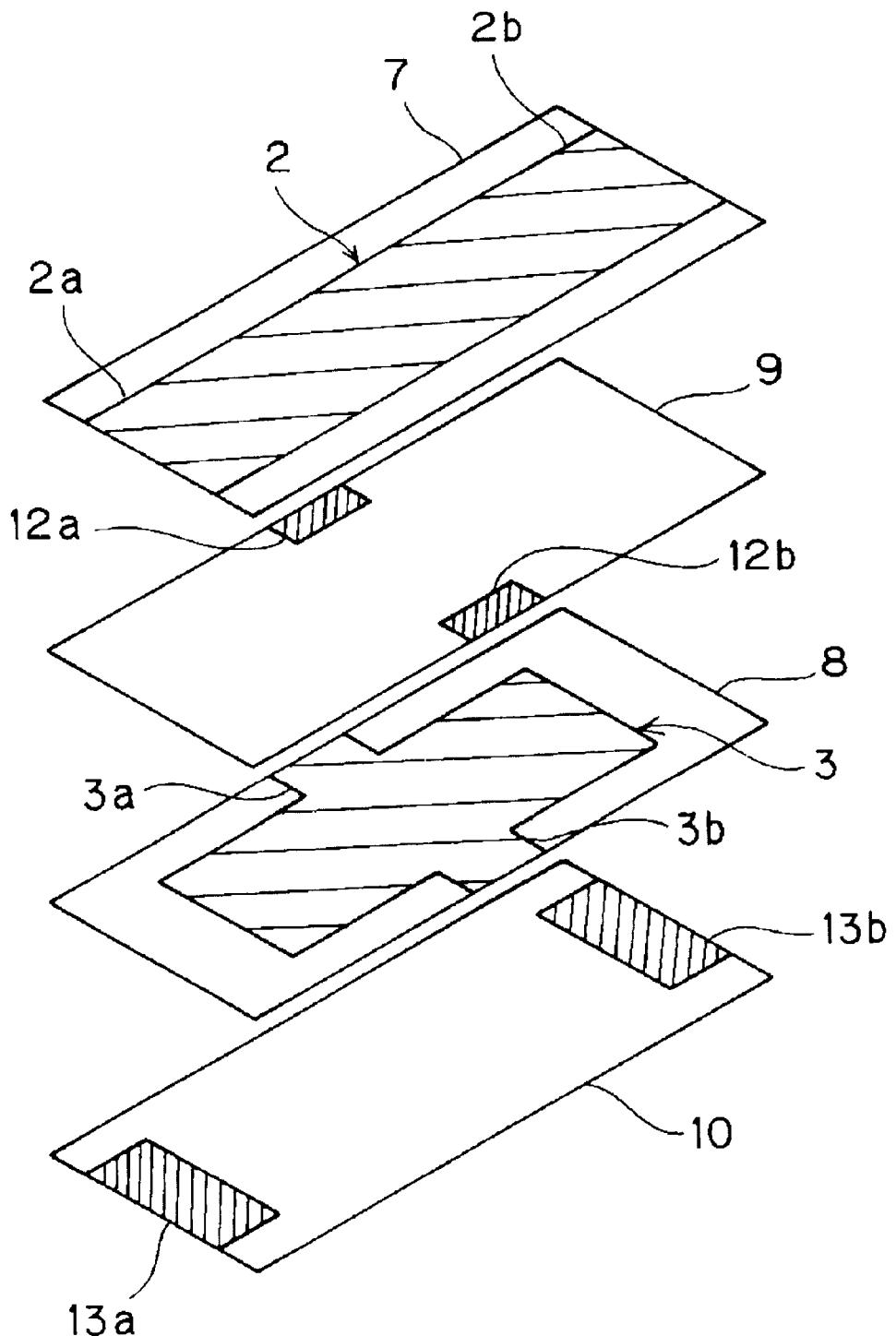
FIG. 5 is a diagram illustrating yet another modification of the feedthrough type three-terminal capacitor according to a preferred embodiment of the present invention.
Figure 6A:
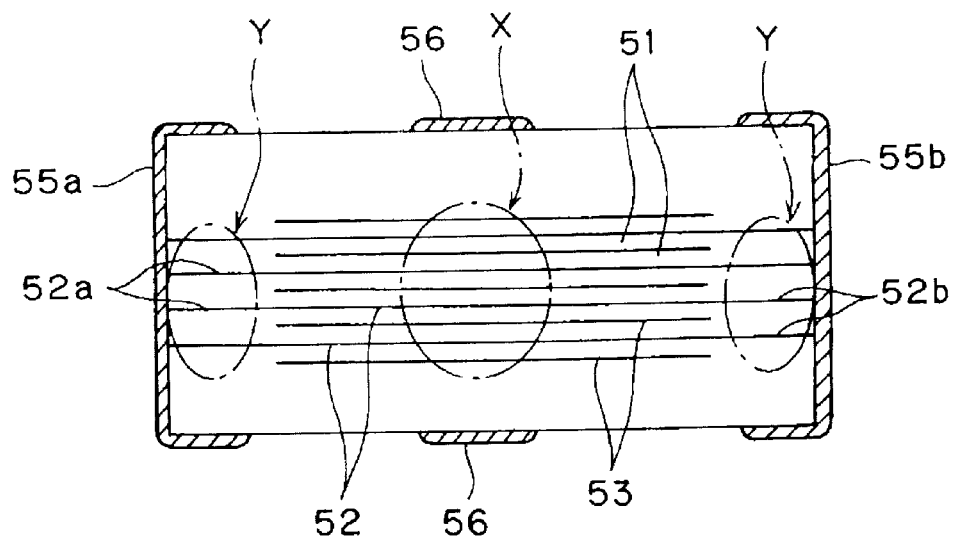
FIG. 6A is a front cross-sectional view of a conventional feedthrough type three-terminal electronic component (feedthrough type three-terminal capacitor)
Figure 6B:
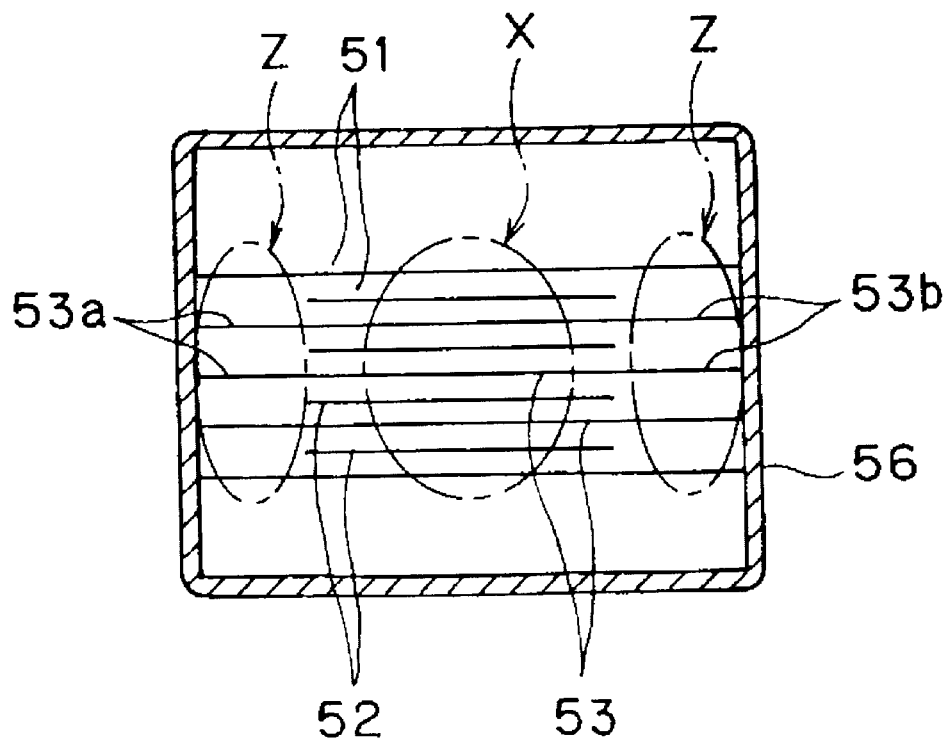
FIG. 6B is a side cross-sectional view of the conventional feedthrough type three-terminal electronic component shown in FIG. 6A.
Figure 7A:
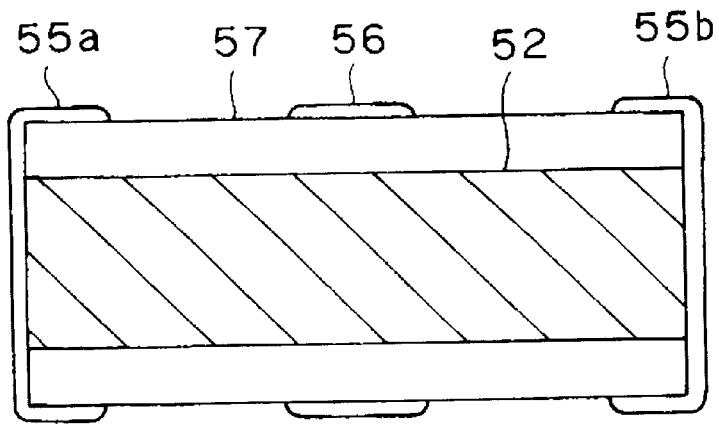
FIG. 7A is a plan view illustrating the form of an internal signal electrode making up a conventional feedthrough type three-terminal electronic component.
Figure 7B:
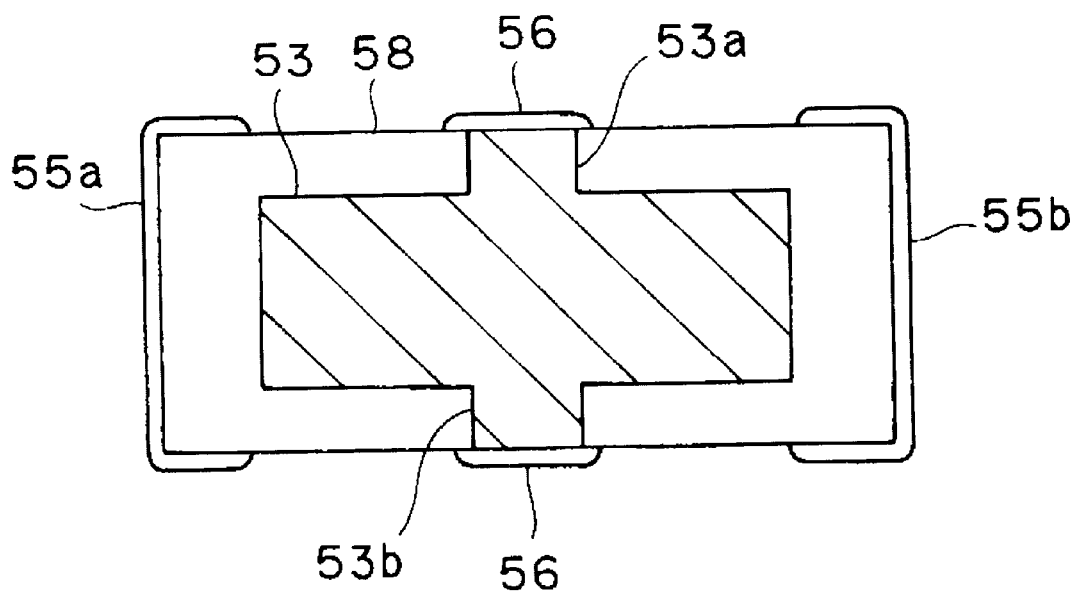
FIG. 7B is a plan view illustrating the form of an internal ground electrode.
Figure 8:
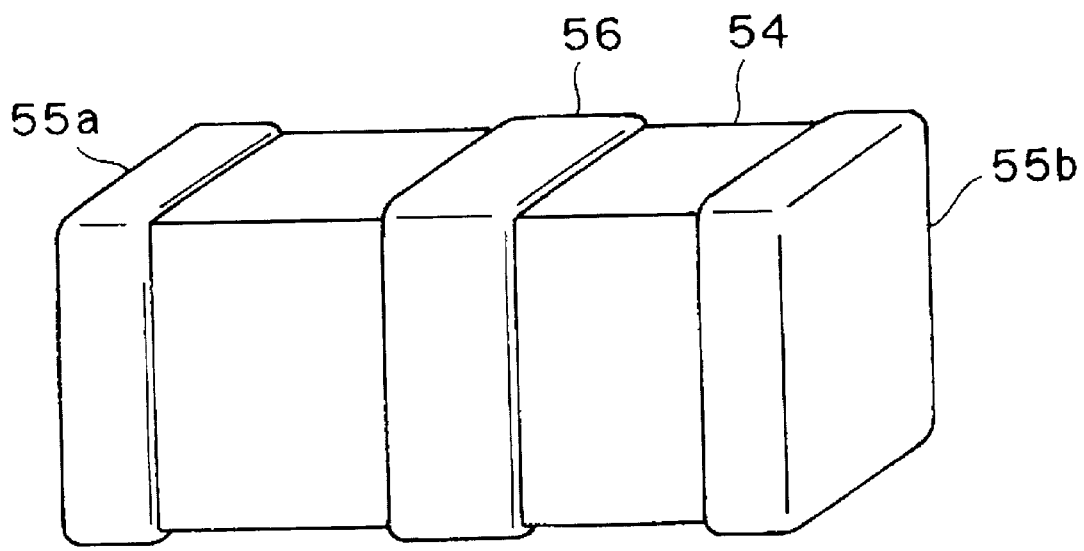
FIG. 8 is a perspective view illustrating the external configuration of a conventional feedthrough type three-terminal electronic component.

Also, though the above-described embodiment is arranged so that the internal dummy electrodes 12a and 12b disposed in a region defined by both side portions of an internal signal electrode 2 and the external ground electrode 6 provided at both side surfaces of the monolithic structure 4 are disposed on the same plane as the internal signal electrode 2, and so that the internal dummy electrodes 13a and 13b disposed in a region defined by both side portions of an internal ground electrode 3 and the external signal electrodes 5a and 5b provided at both end surfaces of the monolithic structure 4 are disposed on the same plane as the internal ground electrode 3, a configuration may be made as shown in FIG. 5, wherein the internal dummy electrodes 12a and 12b and the internal dummy electrodes 13a and 13b are disposed on ceramic green sheets 9 and 10 upon which no internal signal electrodes 2 nor internal ground electrodes 3 are disposed, and the ceramic green sheets 7, 8, 9, and 10 are layered, thereby disposing the internal dummy electrodes 12a, 12b 13a, and 13b, on planes different to the planes on which the internal signal electrodes 2 and internal ground electrodes 3 are disposed.

Further, although not shown in any of the drawings, an arrangement may be provided wherein internal dummy electrodes equivalent to the internal dummy electrodes 12a, 12b 13a, and 13b shown in FIG. 5 are disposed on one ceramic green sheet upon which no internal signal electrodes nor internal ground electrodes are disposed, and this ceramic green sheet is layered along with the ceramic green sheets upon which the internal signal electrodes and internal ground electrodes are disposed.

Also, in some instances, internal dummy electrodes may be disposed on ceramic green sheets upon which internal signal electrodes and internal ground electrodes are disposed, as well as on ceramic green sheets upon which no internal signal electrodes nor internal ground electrodes are disposed.

Also, the present preferred embodiment has been described with an example of a feedthrough type three-terminal capacitor, but the present invention is by no means restricted to this, and is applicable to other feedthrough type three-terminal electronic components, such as feedthrough type three-terminal resistors and other suitable devices.

Further, the present invention is by no means restricted by any points of preferred embodiments described above. Instead, various applications and modifications may be made regarding the type of material making up the dielectric layers and internal electrodes, the number of layers, etc., within the scope of the present invention.

Thus, according to the first preferred embodiment of the present invention, a feedthrough type three-terminal electronic component has internal dummy electrodes, which essentially do not contribute to electrostatic capacity formation, disposed in at least one of a region defined by both side portions of internal signal electrodes and the external ground electrode provided on both side surfaces of the monolithic structure, viewing the monolithic structure in planar fashion, and a region defined by both side portions of internal ground electrodes and external signal electrodes provided on both side surfaces of the monolithic structure, viewing the monolithic structure in planar fashion, thereby eliminating irregularities in the concentration of the internal electrodes disposed in the monolithic structure, making uniform the sintering state of the internal electrodes when baking the monolithic structure, thereby suppressing and preventing irregularities in resistance from occurring in the internal electrodes, and obtaining a highly reliable feedthrough type three-terminal electronic component which has small DC resistance in a reliable manner.

The arrangement wherein, of the internal dummy electrodes, internal dummy electrodes, disposed in a region defined by both side portions of internal signal electrodes and the external ground electrode provided on both side surfaces of the monolithic structure, have a form generally corresponding to the form of the extension portions of internal ground electrodes, and have dimensions extending in the direction following both side surfaces of the monolithic structure which are essentially the same as or greater than the width of the extension portions of the internal ground electrodes, and internal dummy electrodes, disposed in a region defined by both side portions of internal ground electrodes and external signal electrodes provided on both side surfaces of the monolithic structure, have a form generally corresponding to the form of the extension portions of internal signal electrodes, and have dimensions extending in the direction following both end surfaces of the monolithic structure which are essentially the same as or greater than the width of the extension portions of the internal signal electrodes, enables the disposed state of the internal electrodes to be uniform in an even more reliable manner, thereby achieving further advantages of the present invention.

Also, with the arrangement wherein, of a region defined by both side portions of internal signal electrodes and the external ground electrode provided on both side surfaces of the monolithic structure and a region defined by both side portions of internal ground electrodes and external signal electrodes provided on both side surfaces of the monolithic structure, internal dummy electrodes are disposed only in the former region, the sintering state is made uniform to a degree which is sufficiently meaningful for actual use, and DC resistance is greatly reduced.

Also, in the event that Ni or a Ni alloy is used as the material for forming the internal signal electrodes and the internal ground electrodes, irregularities in the sintering state occur more readily due to imbalance in the state of internal electrodes disposed in the monolithic structure, but the sintering state can be made uniform and the DC resistance reduced by applying features of preferred embodiments of the present invention in such a case, which is particularly significant.

Also, as the number of layers of internal electrodes increases, the thickness of the internal signal electrodes, internal ground electrodes, and internal dummy electrodes often becomes thinner, and in the event that the thickness of the internal electrodes including the extension portion is about 2 µm or less, great fluctuations in DC resistance readily occur due to the sintering state of the internal electrodes, but in such a case, applying features of preferred embodiments of the present invention allows a feedthrough type three-terminal electronic component to be obtained with a uniform sintering state and small DC resistance, which is particularly significant.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A feedthrough type three-terminal electronic component comprising:

a monolithic structure including a plurality of stacked layers including at least one pair of an internal signal electrode and an internal ground electrode arranged to face each other with a dielectric layer disposed therebetween;

a plurality of external signal electrodes arranged to communicate with extension portions of the internal signal electrodes and disposed on both end surfaces of said monolithic structure; and an external ground electrode arranged to communicate with extension portions of the internal ground electrodes and disposed on both side surfaces of said monolithic structure; wherein internal dummy electrodes which do not contribute to generation of electrostatic capacity are disposed in at least one of:

(a) a region defined by both side portions of the internal signal electrodes and the external ground electrode provided on both side surfaces of the monolithic structure, viewing the monolithic structure in planar fashion; and (b) a region defined by both side portions of the internal ground electrodes and external signal electrodes provided on both side surfaces of the monolithic structure, viewing the monolithic structure in planar fashion.

2. A feedthrough type three-terminal electronic component according to claim 1, wherein, of said internal dummy electrodes;

(a) internal dummy electrodes, disposed in a region defined by both side portions of internal signal electrodes and the external ground electrode provided on both side surfaces of the monolithic structure, have a form essentially corresponding to the form of the extension portions of internal ground electrodes, and have dimensions extending in the direction following both side surfaces of the monolithic structure which are essentially the same as or greater than the width of the extension portions of the internal ground electrodes; and (b) internal dummy electrodes, disposed in a region defined by both side portions of internal ground electrodes and external signal electrodes provided on both side surfaces of the monolithic structure, have a form essentially corresponding to the form of the extension portions of internal signal electrodes, and have dimensions extending in the direction following both end surfaces of the monolithic structure which are essentially the same as or greater than the width of the extension portions of the internal signal electrodes.

3. A feedthrough type three-terminal electronic component according to claim 1, wherein internal dummy electrodes are disposed only in a region defined by both side portions of internal signal electrodes and the external ground electrode provided on both side surfaces of the monolithic structure.

4. A feedthrough type three-terminal electronic component according to claim 1, wherein the internal signal electrodes and the internal ground electrodes are made of one of Ni and a Ni alloy.

5. A feedthrough type three-terminal electronic component according to claim 1, wherein the thickness of the internal signal electrodes, the internal ground electrodes, and the internal dummy electrodes is about 2 µm or less.

6. A feedthrough type three-terminal electronic component according to claim 1, wherein the feedthrough type three-terminal electronic component is a feedthrough type three-terminal capacitor.

7. A feedthrough type three-terminal electronic component according to claim 1, wherein extension portions of the internal ground electrodes are connected to the external ground electrode which is disposed on both side surfaces of the monolithic structure in a wraparound manner.

8. A feedthrough type three-terminal electronic component according to claim 1, wherein the dielectric layers are made of a barium titanate ceramic material.

9. A feedthrough type three-terminal electronic component according to claim 1, wherein the dielectric layers each has a thickness of about 20 µm.

10. A feedthrough type three-terminal electronic component according to claim 1, wherein a gap between the internal dummy electrodes and the internal signal electrode, and another gap between the internal dummy electrodes and the internal ground electrode are equal to approximately 0.1 mm.

11. A feedthrough type three-terminal electronic component comprising:

a monolithic structure including a plurality of stacked layers including at least one pair of an internal signal electrode and an internal ground electrode arranged to face each other with a dielectric layer disposed therebetween;

a plurality of external signal electrodes arranged to communicate with extension portions of the internal signal electrodes and disposed on both end surfaces of said monolithic structure; and an external ground electrode arranged to communicate with extension portions of the internal ground electrodes and disposed on both side surfaces of said monolithic structure; wherein internal dummy electrodes which do not contribute to generation of electrostatic capacity are disposed in both of:

(a) a region defined by both side portions of internal signal electrodes and the external ground electrode provided on both side surfaces of the monolithic structure, viewing the monolithic structure in planar fashion; and (b) a region defined by both side portions of the internal ground electrodes and external signal electrodes provided on both side surfaces of the monolithic structure, viewing the monolithic structure in planar fashion.

12. A feedthrough type three-terminal electronic component according to claim 11, wherein, of said internal dummy electrodes;

(a) internal dummy electrodes, disposed in a region defined by both side portions of internal signal electrodes and the external ground electrode provided on both side surfaces of the monolithic structure, have a form essentially corresponding to the form of the extension portions of internal ground electrodes, and have dimensions extending in the direction following both side surfaces of the monolithic structure which are essentially the same as or greater than the width of the extension portions of the internal ground electrodes; and (b) internal dummy electrodes, disposed in a region defined by both side portions of internal ground electrodes and external signal electrodes provided on both side surfaces of the monolithic structure, have a form essentially corresponding to the form of the extension portions of internal signal electrodes, and have dimensions extending in the direction following both end surfaces of the monolithic structure which are essentially the same as or greater than the width of the extension portions of the internal signal electrodes.

13. A feedthrough type three-terminal electronic component according to claim 11, wherein internal dummy electrodes are disposed only in a region defined by both side portions of internal signal electrodes and the external ground electrode provided on both side surfaces of the monolithic structure.

14. A feedthrough type three-terminal electronic component according to claim 11, wherein the internal signal electrodes and the internal ground electrodes are made of one of Ni and a Ni alloy.

15. A feedthrough type three-terminal electronic component according to claim 11, wherein the thickness of the internal signal electrodes, the internal ground electrodes, and the internal dummy electrodes is about 2 $\mu$m or less.

16. A feedthrough type three-terminal electronic component according to claim 11, wherein the feedthrough type three-terminal electronic component is a feedthrough type three-terminal capacitor.

17. A feedthrough type three-terminal electronic component according to claim 11, wherein extension portions of the internal ground electrodes are connected to the external ground electrode which is disposed on both side surfaces of the monolithic structure in a wraparound manner.

18. A feedthrough type three-terminal electronic component according to claim 11, wherein the dielectric layers are made of a barium titanate ceramic material.

19. A feedthrough type three-terminal electronic component according to claim 11, wherein the dielectric layers each has a thickness of about 20 $\mu$m.

20. A feedthrough type three-terminal electronic component according to claim 11, wherein a gap between the internal dummy electrodes and the internal signal electrode, and another gap between the internal dummy electrodes and the internal ground electrode are equal to approximately 0.1 mm.

* * * * *